(No Model.)
M. FRENCH.
DEVICE FOR FEEDING AND WATERING POULTRY.
No. 395,490. Patented Jan. 1, 1889.
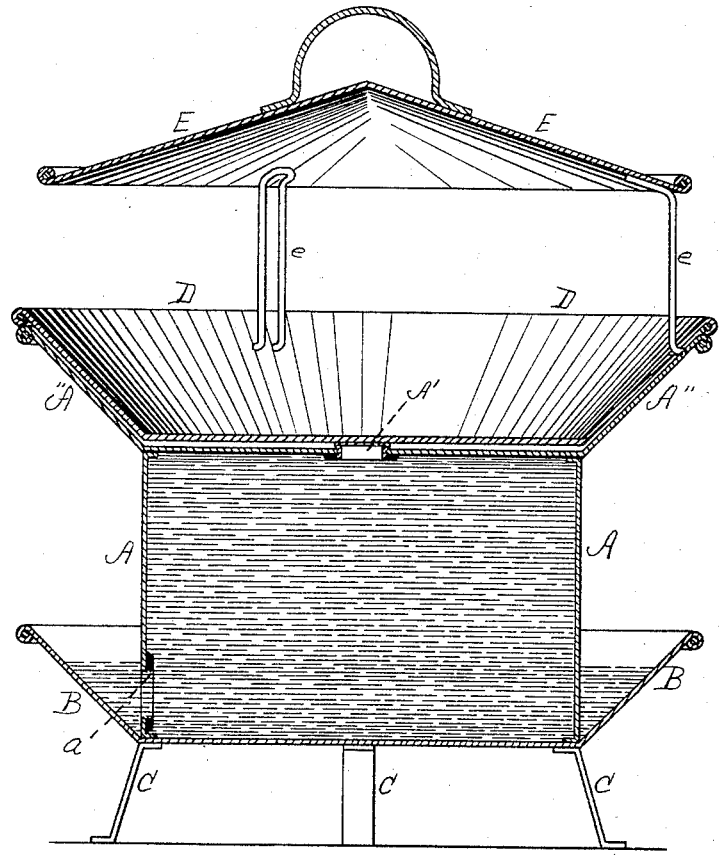
WITNESSES.
J. M. Hartnett,
A. W. Easterbrook
INVENTOR-
Matthew French.
By his Att'y,
Henry W. Williams

UNITED STATES PATENT OFFICE.

MATTHEW FRENCH, OF HAVERHILL, MASSACHUSETTS.

DEVICE FOR FEEDING AND WATERING POULTRY.

SPECIFICATION forming part of Letters Patent No. 395,490, dated January 1, 1889.

Application filed April 16, 1888. Serial No. 270,865. (No model.)

*To all whom it may concern:*

Be it known that I, MATTHEW FRENCH, of Haverhill, in the county of Essex and State of Massachusetts, have invented a new and Improved Device for Feeding and Watering Poultry, of which the following is a specification.

In the accompanying drawing a view in vertical section is shown of a poultry-feeding device embodying my improvement.

A is a tank or reservoir surrounded at its base by an annular watering-trough, B, and supported by legs C at a suitable height from the ground. A screw-cap, A', is set into the top of the tank A, and a similar cap, $a$, in the side below the level of the top of the trough B. The top of the tank is formed up into pan shape at A'', and in this portion is set the feed-pan D, made to fit into the pan A''. This pan, with its contents, is protected by a canopy, E, which is supported by standards of any suitable description, those lettered $e$ in the drawing consisting of wire soldered to the canopy, and springing at their lower ends into suitable perforations in the feed-pan.

It is designed that the poultry shall take feed from the pan D and water from the trough B, both of which are so arranged and constructed that the fowls cannot get into them and tread upon the feed and foul either the feed or water. Access to the feed-pan is prevented by the canopy, (which also serves as protection from the weather,) and access to the watering-trough is prevented by the position and shape of the tank. To fill the feed-pan, remove the canopy by springing out the wire supports $e$. To fill the tank, remove the feed-pan, unscrew the cap A', and close the cap $a$. Fill the tank with water, replace the cap A', and open the cap $a$, and the water will flow into the trough in accordance with a well-known principle. The arrangement of the caps A' and $a$ obviates the necessity of tipping over the tank and filling it from the trough.

Having thus fully described my invention, I do not claim as new the principle of a fountain-reservoir, whereby water is supplied in limited quantities to a trough; but

What I claim, and desire to secure by Letters Patent, is—

In a device for feeding and watering poultry, the combination of the tank A, formed up into pan shape at A'', trough B, feed-pan D, canopy E, and detachable standards $e$, supporting said canopy, substantially as and for the purpose set forth.

MATTHEW FRENCH.

Witnesses:
HENRY W. WILLIAMS,
J. M. HARTNETT.